(12) United States Patent
Salinas

(10) Patent No.: US 12,546,084 B1
(45) Date of Patent: Feb. 10, 2026

(54) UNDERGROUND WATER BARRIER INSTALLATION SYSTEM AND A METHOD FOR INSTALLING AN UNDERGROUND WATER BARRIER

(71) Applicant: Juan Eloy Salinas, La Joya, TX (US)

(72) Inventor: Juan Eloy Salinas, La Joya, TX (US)

( * ) Notice: Subject to any disclaimer, the term of this patent is extended or adjusted under 35 U.S.C. 154(b) by 26 days.

(21) Appl. No.: 18/511,312

(22) Filed: Nov. 16, 2023

Related U.S. Application Data

(60) Provisional application No. 63/421,793, filed on Nov. 2, 2022.

(51) Int. Cl.
*E02D 19/00* (2006.01)
*E02B 11/02* (2006.01)
*E02D 19/16* (2006.01)

(52) U.S. Cl.
CPC ...... *E02D 19/16* (2013.01); *E02D 2300/0006* (2013.01)

(58) Field of Classification Search
CPC ......... A01G 13/37; A01G 13/33; E02F 5/102; E02F 5/10; E02F 5/106; A01B 13/08; E02D 19/16
See application file for complete search history.

(56) References Cited

U.S. PATENT DOCUMENTS

| | | | | |
|---|---|---|---|---|
| 3,309,875 A | * | 3/1967 | Niederwemmer | E02B 13/00 405/38 |
| 3,339,369 A | * | 9/1967 | Ryan | H02G 1/06 405/176 |
| 3,585,804 A | | 6/1971 | Sramek | |
| 3,590,588 A | | 7/1971 | Draper | |
| 3,903,817 A | * | 9/1975 | Lewin | A01B 13/08 111/152 |
| 4,098,089 A | * | 7/1978 | Zaslavsky | A01B 17/00 405/174 |
| 4,379,655 A | | 4/1983 | Brost et al. | |

(Continued)

*Primary Examiner* — Benjamin F Fiorello
(74) *Attorney, Agent, or Firm* — John Rizvi; John Rizvi, P.A.—The Patent Professor ®

(57) ABSTRACT

An underground water barrier installation system is provided herein, that contains a plowing apparatus having an enclosed chamber and a frame located above it. The system either has a roll of film located in the enclosed chamber beneath the ground, or alternatively, the frame contains a roll of biodegradable film and two rollers containing line above the ground. In the system having the roll of film located above the ground, the lines from the rollers are heat affixed to the edges of the film by two heated roller binding mechanisms. The system then also includes a cylindrical duct system which can efficiently move the film having the lined edges therethrough and into the internal chamber of the plowing apparatus, wherein the film having the lined edges is straightened by passing the lined edges through two side straightening mechanisms and then is fed through a slit in the back of the plowing apparatus. There are also provided methods herein which comprises providing the water barrier installation system, feeding the film, and if present, lines for the edging through the system; attaching the frame of the system to a towing vehicle and pulling the plowing apparatus at a depth through the ground such that the line edged film is dispensed at the depth in the ground behind the plowing apparatus as it is pulled through the ground.

8 Claims, 8 Drawing Sheets

(56) References Cited

U.S. PATENT DOCUMENTS

| | | | |
|---|---|---|---|
| 5,685,668 | A | 11/1997 | Justice |
| 5,975,804 | A | 11/1999 | Bockman |
| 6,264,400 | B1 | 7/2001 | Gent |
| 7,056,069 | B1 | 6/2006 | Warnke |
| 7,237,962 | B2 | 7/2007 | Crea |
| 8,430,601 | B1 * | 4/2013 | Chadwick ............... E02F 5/145 |
| | | | 405/164 |
| 9,615,518 | B2 * | 4/2017 | Smucker ................ A01G 25/00 |
| 10,400,415 | B2 | 9/2019 | Dor |
| 11,209,116 | B1 * | 12/2021 | Hussain .............. F16L 58/1009 |
| 2006/0056917 | A1 * | 3/2006 | McCormick ............ E02F 5/101 |
| | | | 405/116 |
| 2013/0164085 | A1 | 6/2013 | Sobrinho |

* cited by examiner

UNDERGROUND WATER BARRIER INSTALLATION SYSTEM AND A METHOD FOR INSTALLING AN UNDERGROUND WATER BARRIER

CROSS-REFERENCE TO RELATED APPLICATIONS

This application claims the benefit of U.S. Provisional Patent Application Ser. No. 63/421,793, filed on Nov. 2, 2022, which is incorporated by reference herein in its entirety.

FIELD OF THE INVENTION

The present invention relates generally to the field of agriculture. More particularly, the present invention relates generally to devices and methods for decreasing water and nutrient run off from crops.

BACKGROUND OF THE INVENTION

The practice of agriculture has progressed over the last century from largely small farms covering dozens of acres to industrialized commercial farms which occupy hundreds to thousands of acres. The development of farming has also led to the utilization of more and more acreage which was previously thought to be unsuitable to viable producing farmland.

These changes have been affected over time due to the development of many different aspects of farming. For example, the efficiency of commercial farms is dependent on the use of modern fertilizers and irrigation sources and techniques which provide for the ability to farm soil located in locations previously thought to be barren or which have insufficient rainfall to sustain crops.

However, despite these changes, some areas of the world are located in eco-climates which have quick draining soil, e.g., sandy soil, that cannot be easily remediated. Such soils do not have the inherent ability to retain water in the soil from rain or irrigation at a level which can provide sufficient moisture to the roots of crops planted in such soil. In addition, the rapid draining of water through such soil tends to remove nutrients which are present in the soil and to wash away any fertilizers which are applied to the soil. Such nutrients and fertilizer get deposited at depths significantly below the reach of plant roots. Thus, even if such soil is watered and fertilized according to proper agricultural practices, the yield of the crops from such soil tends to be poor.

One potential solution is the supplementation of the soil with soil additives which can reduce or eliminate the poor draining soil. Some such additives could be compost, manure, mulch and the like. However, adding sufficient organic matter to quick draining soils like sandy soil so as to affect a permanent improvement in the soil entails significant costs, which make the economical farming of the land containing such soil impractical.

Another method of coping with sandy soil is to just plant crops therein which can sustain such a poor nutrient and low water environment. However, such a solution significantly limits the type of crops which can be grown in such soil and often enough sandy soil crops are not sufficiently profitable to justify the expense of farming them.

One other method of coping with sandy soil is the installation of underground water barriers. These underground water barriers, when placed at a depth which keeps moisture and nutrients within the reach of the roots of such soil, do provide for an improvement in the ability to farm such soil. Nonetheless, the placement of an underground water barrier is not easily accomplished over the large acreage of commercial farms. One technique to doing so is to trench large swaths of land, lay the underground water barrier and then return and cover over the water barrier with the trenched soil. However, this entails an extensive process which is time-consuming and also expensive in terms of fuel for the farm machinery involved.

Accordingly, there remains a need for a solution to at least one of the aforementioned problems. For instance, there is an established need for an underground water barrier installation system that provides an underground water barrier that avoids the needs for trenching and the costs associated therewith and which can be done in a short period of time.

SUMMARY OF THE INVENTION

The present invention can be directed to an underground water barrier installation system that employs a plowing apparatus having an internal chamber having a slit in a rear portion thereof, which slit can either be fed with a roll of film located in the internal chamber, or the fed by an above ground roll of film which is bonded along its edges with a length of line and fed to the internal chamber by a circular duct system, wherein it is straightened therein prior to being fed through the slit. Both versions of the installation system can have a frame attached to the plowing apparatus which frame is located above ground and can be used to attach the system to a towing vehicle so that the water barrier can be installed beneath the ground.

Surprisingly both embodiments can avoid the use of complicated unfolding mechanisms which provide for a simplified device that is easily operated and maintained.

In a first implementation of the invention there can be provided herein an underground water barrier installation system comprising:
  a plowing apparatus having an internal chamber which has a width, length, and a height, and a flat bottom and a slit along a back of the plowing apparatus;
  a frame located above and connected to the plowing apparatus and which frame is oriented substantially perpendicular to the flat bottom of the plowing apparatus, and which frame has two flat side sections which are parallel and encompass a width that is substantially equivalent to the width of the internal chamber of the plowing apparatus; and,
  a longitudinal roll of film having two opposing longitudinal ends, and wherein the roll of film is disposed in a releasable manner within the width of the internal chamber of the plowing apparatus.

In another aspect of the first implementation of the invention, the plowing apparatus can have a flat bottom and a top that that transitions from an inclined plane front side to a curvilinear and then angled rear side and having two equivalently shaped sides extending from the front side to the back side.

In yet another aspect of the first implementation of the invention, the flat side sections of the frame comprises two equivalent vertically extending substantially flat side sections which form the sides of the plowing apparatus, and which are joined at a top of the flat side sections by a horizontal cross beam therebetween.

In yet even another aspect of the first implementation of the invention, the longitudinal roll of film is disposed on a central supporting dowel which is capped on both sides by end caps.

In yet even a further aspect of the first implementation of the invention, the end caps are fixed in corresponding openings present in the vertically extending substantially flat side sections of the frame.

In a second implementation of the invention, there can be provided herein a method of installing an underground water barrier comprising:

providing the underground water barrier system of the first implementation of the invention;

feeding the film through the slit in the back of the plowing apparatus;

attaching the frame of the underground water barrier installation system to a towing vehicle; and, pulling the underground water barrier installation system through the ground with the towing vehicle such that the plowing apparatus is located at a depth beneath the ground, and such that a length of film is dispensed behind the plowing apparatus and laid at the depth underneath the ground.

In another aspect of the second implementation of the invention, after feeding the film through the slit in the back of the plowing apparatus, the film can be affixed in place underground to provide an anchoring of the same and to facilitate the easy disposal of the remaining film through the slit.

In yet another aspect of the second implementation of the invention, the frame of the underground water barrier installation system is attached to the towing vehicle by two points of attachment which are located on a front portion of the crossbeam.

In yet even another aspect of the second implementation of the invention, the frame of the underground water barrier installation system is attached to the towing vehicle by three points of attachment two of which are located on a front portion of the crossbeam and a third of which is attached to a front portion of a post which is perpendicular to a top of the crossbeam.

In yet still even another aspect of the second implementation of the invention, prior to the step of pulling of the underground water barrier installation system through the ground with the towing vehicle, such is proceeded by the step of sinking the plowing apparatus into the ground to a desired depth.

In a third implementation of the invention there can be provided herein an underground water barrier installation system comprising:

a plowing apparatus having an internal chamber which has a width, length, and a height, and a flat bottom and a slit along a back of the plowing apparatus;

a film and line dispensing frame located above and connected to the plowing apparatus and which frame is oriented substantially perpendicular to the flat bottom of the plowing apparatus, and which frame has two flat side sections which are parallel and encompass a width that is substantially equivalent to the width of the internal chamber of the plowing apparatus;

a longitudinal roll of film having two opposing longitudinal ends and wherein the roll of film is disposed in a releasable manner on the frame in a longitudinal orientation within the two flat side sections of the frame;

two rolls of line, each roll of line located in a position adjacent to one of the opposing longitudinal ends of the roll of film, and each roll of line being disposed in a releasable manner from a position directly adjacent to a flat side section of the frame and within a width of the frame;

two heated roller binding mechanisms each mechanism containing two wheels, at least one of which has an outer surface heated to a temperature sufficient to melt the film onto the line as an edge of the film and the line pass between the two wheels, one of each of the two mechanisms being located on the frame in a position below and directly adjacent to each flat side section of the frame and within the width of the frame;

a cylindrical duct system having a cylindrical duct entrance located below the binding mechanisms and which entrance is substantially centered from the flat side sections of the frame and a cylindrical duct exit centrally located in the internal chamber and along the flat bottom of the plowing apparatus and directed towards the slit along the back of the plowing apparatus; and, two film straightening mechanisms, each mechanism containing a line guiding rotor and a line pressing rotor which are disposed along an internal width side of the internal chamber of the plowing apparatus between the cylindrical duct exit and the slit in the back of the plowing apparatus.

In another aspect of the third implementation of the invention, the flat side sections of the system can further comprise two parallel equivalent vertically extending substantially flat side portions which make up the sides of the plowing apparatus, and which extend upward therefrom a length, and which are joined at a midpoint of the length of the flat side sections by a horizontal cross beam therebetween.

In yet another aspect of the third implementation of the invention, a top portion of each of the two equivalent vertically extending substantially flat side sections has a flat supporting sections emanating from the sides of the top portion such that the supporting sections are perpendicular to the vertically extending substantially flat side section and in the same plane therewith.

In yet even a further aspect of the third implementation of the invention, one of the two flat supporting sections horizontally corresponds (i.e., mirrors) an identical top flat supporting section on the other vertically extending substantially flat side section, and the corresponding flat supporting sections each have a hole therein, and a dowel located therebetween with the ends of the dowel supported in the corresponding holes of the flat supporting sections, and wherein the longitudinal roll of film is supported on the dowel.

In yet even a still further aspect of the third implementation of the invention, the other of the two flat supporting sections horizontally corresponds to an identical top flat supporting section on the other vertically extending substantially flat side section, and the corresponding flat supporting sections each have a post perpendicularly emanating therefrom and directed towards the horizontally corresponding post, and wherein such posts each contain a spool thereon, each spool containing one of the two rolls of line.

In yet another aspect of the third implementation of the invention, wherein the cylindrically duct system has a diameter of from about 1/10 to about 1/5 of a width of the longitudinal roll of film.

In yet still even a further aspect of the third implementation of the invention, wherein the cylindrically duct system traverses along one half of a rear side of the horizontal cross beam of the frame in a direction towards one of the vertically extending substantially flat side portions and the traverses down along a rear side thickness of the vertically extending substantially flat side section and into the internal chamber of the plowing apparatus.

In a fourth implementation of the invention there can be provided herein a method of installing an underground water barrier comprising:

providing the underground water barrier installation system of the third embodiment of the invention;

feeding each of the longitudinal ends of the film and each of the two lines from the two rolls between the two wheels of each of the corresponding heated roller binding mechanisms, into the entrance of the cylindrical duct, out of the exit of the cylindrical duct, through the corresponding film straightening mechanisms, and then through the slit in the back of the plowing apparatus;

attaching the frame of the underground water barrier installation system to a towing vehicle; and, pulling the underground water barrier installation system through the ground with the towing vehicle such that the plowing apparatus is located at a depth beneath the ground, and such that a length of film is dispensed behind the plowing apparatus and laid at the depth underneath the ground.

In yet another aspect of the fourth implementation of the invention herein wherein after feeding the film through the slit in the back of the plowing apparatus, the film can be affixed in place underground to provide an anchoring of the same and to facilitate the easy disposal of the remaining film through the slit.

In yet another aspect of the fourth implementation of the invention, the frame of the underground water barrier installation system is attached to the towing vehicle by two or three points of attachment which are located on the crossbeam of the frame.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION

Figure 1:
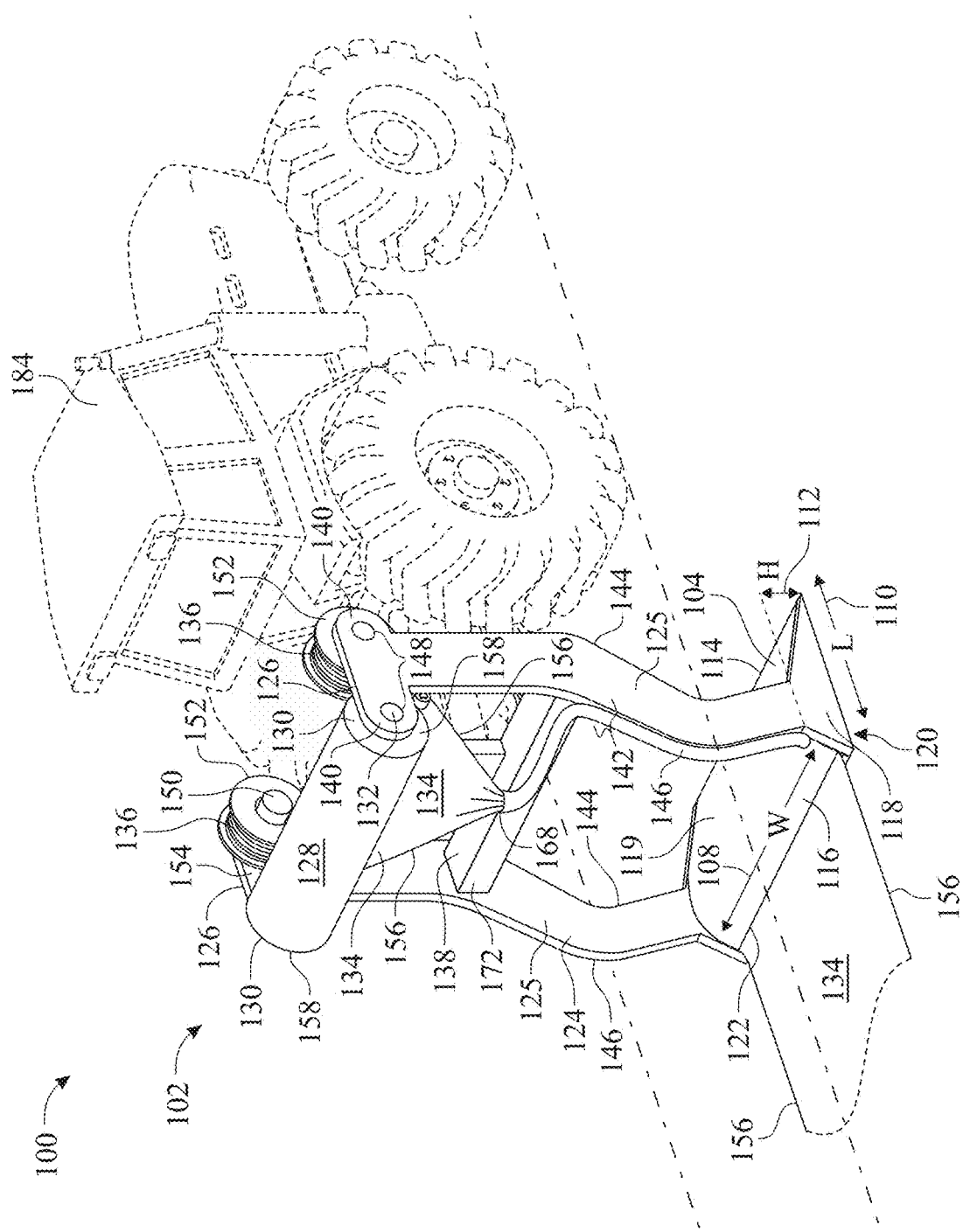
FIG. 1 present a rear perspective view of a top film feeding embodiment of the underground water barrier installation system of the present invention.
Figure 3:
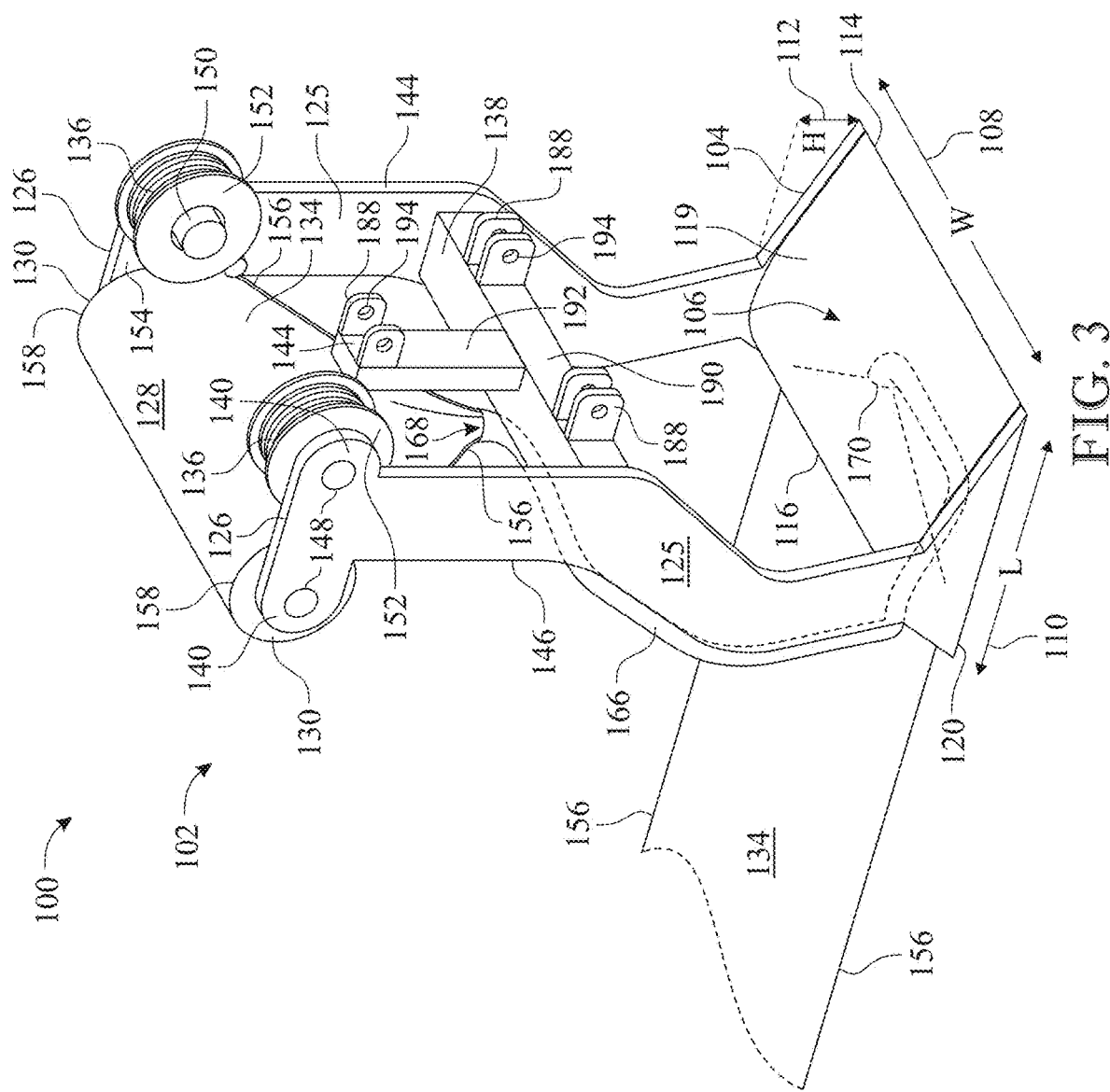
FIG. 3 presents a front perspective view of the underground water barrier installation system of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1 and/or FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-3 and 5, there can be provided an underground water barrier installation system 100 ("the system 100") in a top film feeding embodiment 102 ("the top feeding system 102"). The top feeding system 102 can have a plowing apparatus 104 having an internal chamber 106, and which plowing apparatus 104 can have a width "W" 108, a length "L" 110 and a height "H" 112. The width 108 can be from about four feet to about 12 feet, preferably from about 6 feet to about 8 feet. The length 110 can be from about 2 feet to about 6 feet, preferably from about 3 feet to about 5 feet. The heigh 112 can be from about 1 foot to about 4 feet, preferably from about 2 feet to about 3 feet.

The plowing apparatus 104 can have a front end 114 and a back side 116 and two corresponding identical equivalent width side ends 118. The plowing apparatus 104 can have a top side 119, a flat bottom 120, and a slit 122 along the back side 116, which slit 122 can run the from 70% to 100% of the entire width 108 of the back side 116 and is centered there along and extends through the back side 116 into the internal chamber 106. The plowing apparatus can 104 be made of a metal material selected from the group consisting of steel, stainless steel, iron, and the like.

The top feeding system 102 can contain a film and line dispensing frame 124 ("the frame 124") located above and connected to the plowing apparatus 104. The frame 124 can have two equivalent vertically extending substantially flat side sections 125 ("flat side sections 125") which encompass a width therebetween which is equivalent to the width 108 of the internal chamber 106 of the plowing apparatus 104. The flat side sections 125 can form the sides of the plowing apparatus 104 and the sides of the internal chamber 106 therein, and which emanate from the flat bottom 120 up to a top 126 of the flat side section 125. The flat side sections 125 can be parallel and mirror each other in their shape and components attached thereto.

The top portion 126 of each of the two flat side portions 125 can have flat supporting sections 140 emanating from the sides of the top portion 126 such that the flat supporting sections 140 are perpendicular, or substantially perpendicular to the corresponding flat side section 125 and in the same plane therewith. The flat side sections 125 can have a thickness 142 and a front portion 144 and a rear portion 146 thereof. In one embodiment the thickness 142 of the flat side sections 125 can be uniform throughout and is preferably from about 2 inches to about 6 inches.

As noted above, the flat side sections 125 can be identical (mirror) to each other and correspond to each other's parts and locations accordingly. For example, one of the two flat supporting sections 140 horizontally corresponds (mirrors) with an identical top flat supporting section 140 on the other flat side section 125, and each of these flat supporting sections 140 can have a hole 148 therein, and a dowel (not shown) located between the horizontally corresponding flat side support sections 140, which dowel supports the longitudinal roll of film 128 thereon.

The other of the two flat supporting sections 140 which are adjacent to the support section 140 used to support the longitudinal roll of film 128, is used to support a post 150 which perpendicularly emanates from the support section 140 such that the post 150 is directed towards the horizontally corresponding post 150 from the flat support section 140 located on the opposing flat side section 125. Each of such posts 150 support and contain a spool 152 thereon, each spool 152 containing a roll of line 136 thereon. Each post can have a length of from about 18 inches to about 36 inches and can have a diameter of from about 1 inch to about 4 inches.

The frame 124 can be oriented substantially perpendicular to the flat bottom 120 of the plowing apparatus 104; the term "substantially" as regards the orientation of the frame is to be understood that the vertical direction of the flat side sections 125 of the frame 124 may be curvilinear in parts, but a line drawn from the flat bottom 120 to the top 126 of the flat side sections 125 is perpendicular to the flat bottom 120. The frame 124 can be made of the same metal materials described herein above. All of the components described herein can be made of the metal materials described herein unless described otherwise. The flat side sections 125 can be joined at a midpoint of their length by a horizontal cross beam 138. The cross beam 138 can have a length which corresponds to the width "W" 108 of the plowing apparatus 104, and a width of from about 8 to 15 inches and a thickness of from about 2 inches to about 6 inches.

The system 102 can also contain a longitudinal roll of film 128 which has two opposing longitudinal ends 130 which are located within the flat side sections 125 of the frame 124. The roll of film 128 can be made of a plastic film, preferably a biodegradable plastic film. Some suitable examples of plastic films can be polyethylene, polypropylene, polyvinyl chloride, ethylene-propylene terpolymer of the rubbery type or saran, or other plastic films which are impervious to the passage of water. The film can have a thickness ranging from 1 mil ($\frac{1}{1000}$ of an inch) up to about 10 mil, preferably from about 2 mil to about 6 mil in thickness, more preferably from about 3 mil up to about 5 mil. The length of film wrapped in the longitudinal roll of film can be from about ¼ of a mile up to about 5 miles, preferably from about ½ of a mile up to about 2 miles. The width of the film is such that it is not bent when passed through the internal chamber 106 of the plowing apparatus 104. The longitudinal roll of film 128 is disposed in a releasable manner as described herein, such as by being placed on a dowel support (not shown) that passes through a center 132 and is dispensed in the same fashion as a roll of paper towels, such that the film 134 will be released as plowing apparatus 104 and frame 124 are moved along during the towing of the system 102 as described herein below.

The system 102 can also contain two rolls of line 136 each of which are located adjacent to each other on the posts 150 as described herein above. The rolls of line 136 located on the spools 152 are located adjacent, i.e., on the flat supporting section 140 on the other side of the top 126 of the flat side section 126 which supports the longitudinal roll of film 128. The roll of line 136 on each of the two spools 152 on the frame 124 can be disposed in a releasable manner as discussed herein above for the longitudinal roll of film 128, i.e., dispensed as a roll of paper towels, or such, when the end of the roll of line 136 is pulled through the frame 124 and the system 102 as described herein. Preferably the spools 152 and the rolls of line 136 are located within a width of the frame 124, which as described herein above, corresponds to a width of the internal chamber 106 of the plowing apparatus 104, i.e., the distance between the flat side sections 125, and as such, the spools 152, and the longitudinal roll of film 128 are both supported on the inside portions 154 of the supporting sections 140 of the flat side sections 125, and thus, are deemed within a width of the frame 124.

Figure 4:
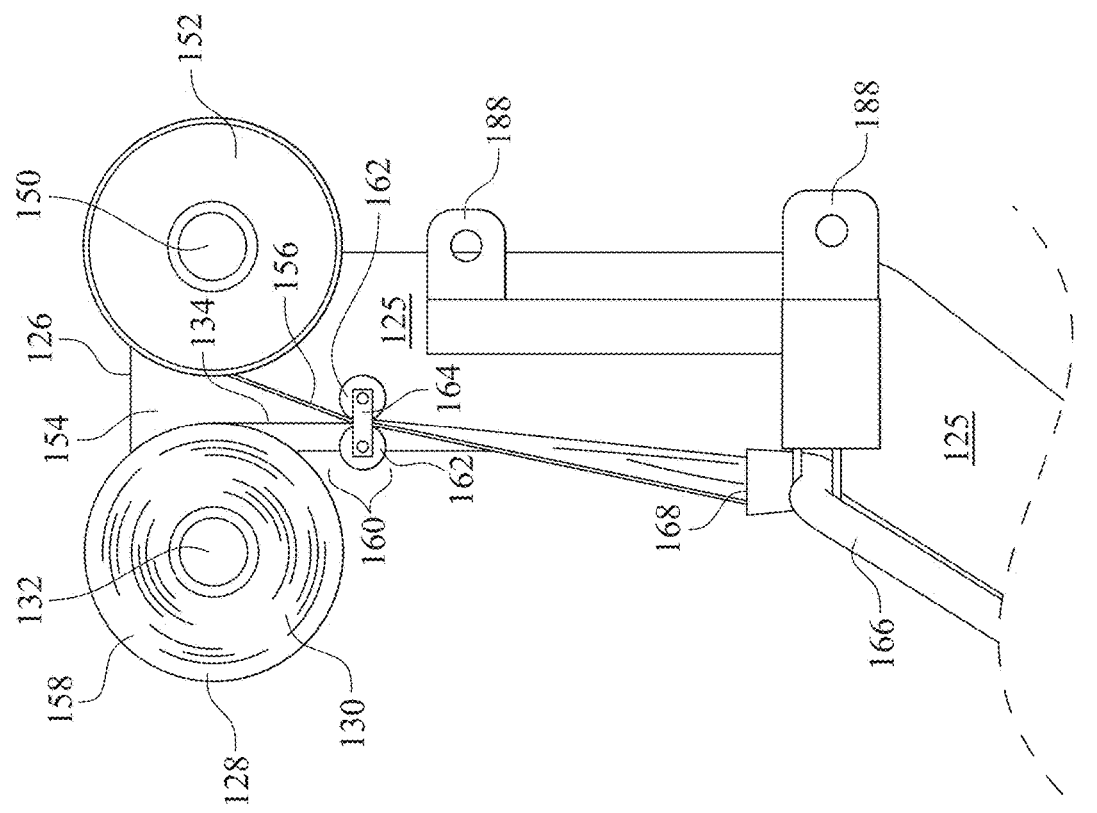
FIG. 4 presents a side view of the film and line dispensing frame containing a longitudinal roll of film and one of the two spools containing the roll of line and showing both being fed into one of the heated roller binding mechanisms to bind line to one of the edges of the film.

Referring more specifically to FIG. 4, the film 134 from the longitudinal roll of film 128 and the line 156 from the roll of line 136 on the spool 152 can be bound together, preferably by heat, i.e., the line 156 can have the edge of the film 134 melted thereon as the line 156 and edge 134 pass between the heated roller binding mechanism 160, which mechanism 160 can contain two wheels 162, which wheels 162 can be connected by a connection brace 164. At least one of the two wheels 162, preferably both wheels 162 can be heated to a temperature sufficient to affect the above described melting of the edge of the film 134 onto the line 156 as these materials are compressed when they pass together through the wheels 162 of the mechanism 160, such temperature may be from about 100° C. to about 250° C., preferably from about 110° C. to about 180° C.

The wheels 162 can be electrically connected to a source of electrical power (not shown) and contain an electrical heating element therein (not shown) which heating elements are known to those of ordinary skill in the art. One of each of the two heated roller binding mechanisms 160 is located on the frame 124 in a position below and directly adjacent to each flat side section 125 on an inside portion 154 thereof, i.e., connected thereto in some manner using common fixation means (not shown). The location of the mechanisms 160 on the flat side portions 125 between and below the longitudinal roll of film 128 and the spool 152 is not limited provided the location can provide steady and continuous feeding of film 134 and line 156 to the mechanism 160. The wheels 162 can be made of any suitable metal or plastic material described herein or any other material known to those of ordinary skill in the art.

The system 102 can also have a cylindrical duct system 166 having cylindrical duct entrance 168 located below the binding mechanisms 160 and which cylindrical duct entrance 168 is substantially centered from the flat side sections 125 of the frame 124. The cylindrical duct system 166 can also have a cylindrical duct exit 170 located in the internal chamber 106 and along the flat bottom 120 of the plowing apparatus 104 and which is directed towards the slit 122 along the back side 116 of the plowing apparatus 104. The cylindrical duct system can have a diameter of from about 1/10 up to about 1/5 of a width of the longitudinal roll of film 128, preferably from about 4 inches up to about 15 inches, preferably from about 6 to about 8 inches. The duct system 166 can be made of any of the metal or plastic materials described herein.

The cylindrical duct system 166 can traverse from the cylindrical duct entrance 166 along one half of a rear side 172 of the horizontal cross beam 138 of the frame 124 in a direction towards one of the flat side sections 125 and traverse down along a rear side 146 thickness 142 of the flat side section 125 and into the internal chamber 106 of the plowing apparatus 104.

Figure 5:
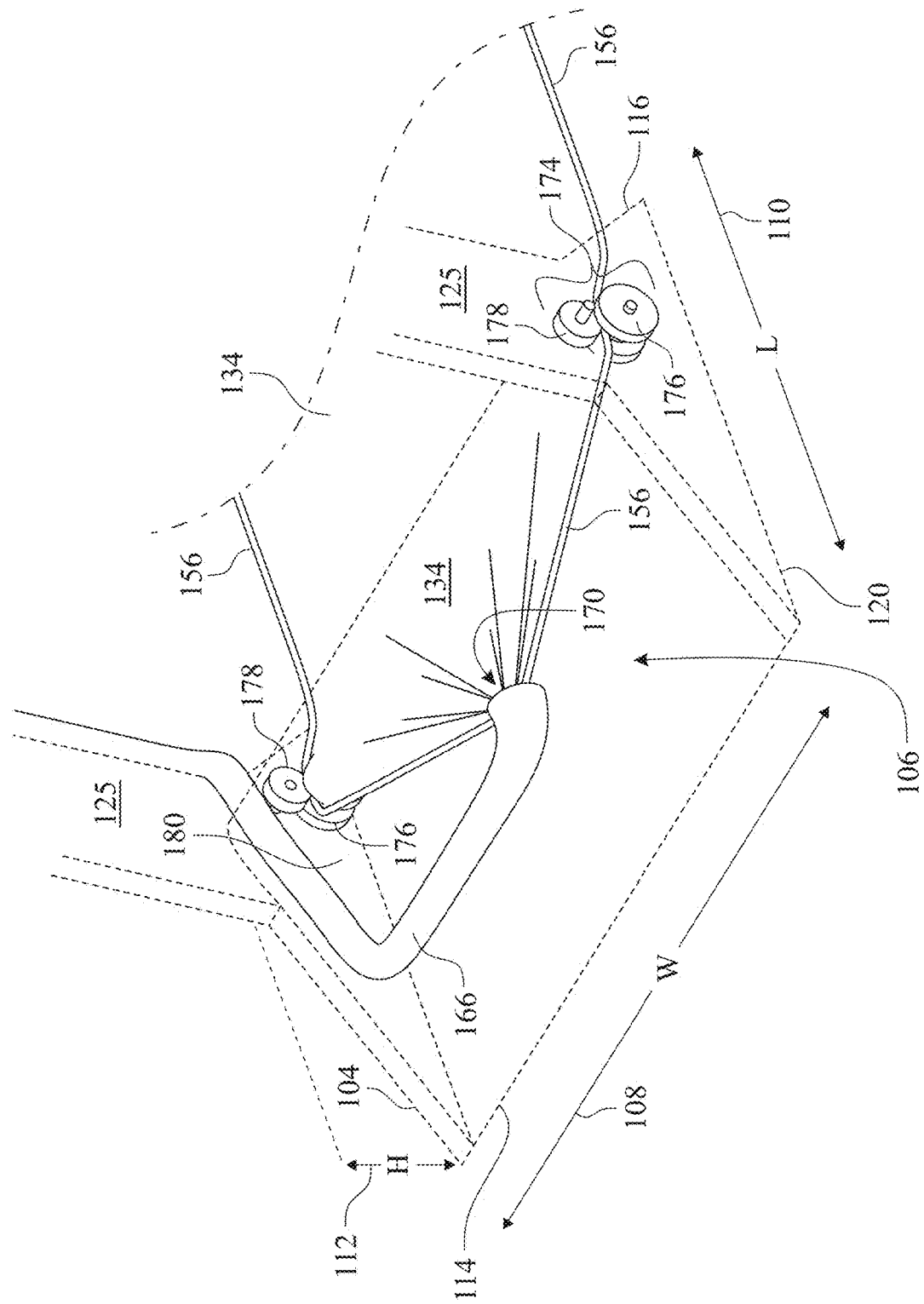
FIG. 5 presents a view of the internal chamber of the plowing apparatus and the cylindrical duct showing the duct exit having cinched line edged film being removed from the duct exit and straightened between the two film straightening mechanisms prior to passing through the slit in the back of the plowing apparatus.

Referring to FIG. 5, the system 102 can also contain two film straightening mechanisms 174, wherein each mechanism 174 contains a line guiding rotor 176, e.g., a pulley, and a line pressing rotor 178 which are disposed along an internal side 180 of the flat side section 125 which corresponds to the side of the internal chamber 106. The film straightening mechanisms 174 are located between the cylindrical duct exit 170 and the slit 122 in the back side 116 of the plowing apparatus 104. The film straightening mechanisms are able to straighten the film 134 as it exits the cylindrical duct exit 170 by pulling on the line 156 which has been attached to the edge 158 of the film 134 by the action of the pulling described herein below, wherein the line 156 runs in a longitudinal direction which is in keeping with the width between the flat side sections 125 of the frame 124.

Figure 2:
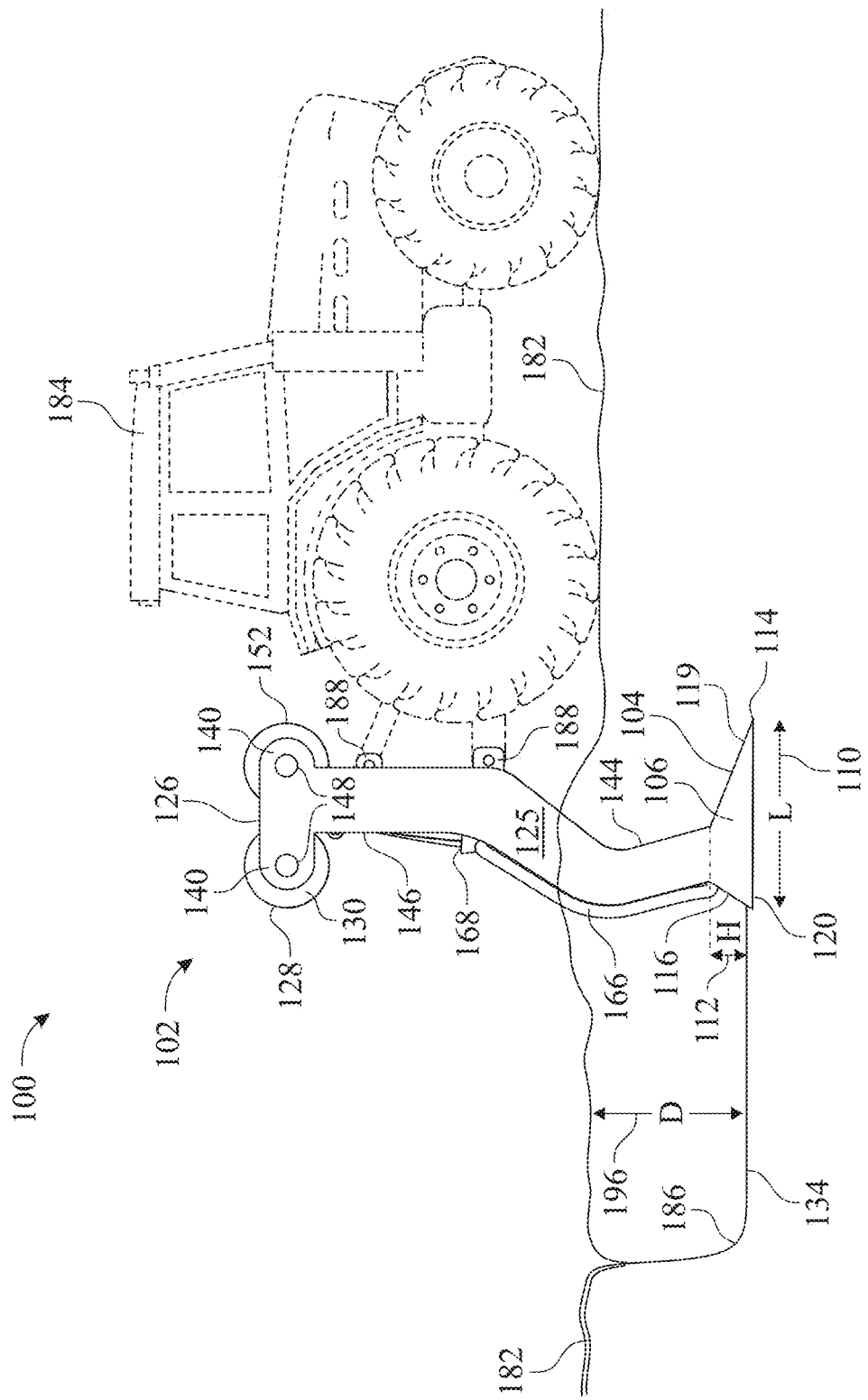
FIG. 2 presents a side view of the underground water barrier installation system of FIG. 1.

Referring to FIGS. 1-5, the system 102 described herein can be used in a method as described herein to lay underground water barrier, specifically the film 134, beneath the ground 182 (see FIG. 2). The method can comprise providing the system 102 as described herein; feeding (i.e., pre-feeding) each of the two longitudinal ends 130 by the edges 158 of the film 134 and each of the two lines 156 from the two rolls of line 136, (one edge and one line) between the two wheels 162 of each of the two corresponding roller binding mechanisms 160 to melt the edge 158 onto the line 156. Then the film 134 having the line 136 melted into the edge 158 on both width sides of the film 134 are fed into the cylindrical duct entrance 168, through the length of cylindrical duct 166, which length can be from 5 to about 10 feet, and out of the cylindrical duct exit 170 and then straightened by moving each of the edges 158 of film 134 which are melted to the line 156 through the corresponding line guiding rotor 176 and line pressing rotor 178 of the film straightening mechanism 174, and then through the slit 122 in the back 116 of the plowing apparatus 104.

Such a pre-feeding step can be advantageous to provide for an initiation of the laying of the film so as to provide a priming of the method. A further advantage can be achieved in the method of operating the system 102 if after the film 134 is fed through the slit 122 in the back side 116 of the plowing apparatus, the end 186 of the film 134 is buried at a depth beneath ground 182 so as to affix the film in the ground and provide anchoring of the same and to facilitate the easy disposal of the remaining film 134 through the system 102 as the system 102 is moved by pulling as described herein.

Thereafter, the method of using the system 102 as described herein can further comprise attaching the frame 124 of the system 102 to a towing vehicle 184 which can be a tractor and the like. The frame 124 of the system 102 can be attached to a towing vehicle 184 by two or three points of attachment which are located on the horizontal cross beam 138 of the frame 124. Two of the points of attachment 188 can be located on a front side 190 of the horizontal cross beam 138 and a third point of attachment 188 can be located on a top 194 of an attachment post 192, all three points of attachment can be any of those known to those of ordinary skill in the art but can in one example include a set of two closely placed protruding posts 188 which protrude perpendicular to the front side surface 190 of the horizontal cross beam and which have holes 194 therein so that a corresponding component with a hole (not shown) can be inserted between the protruding posts 188 and a pin (not shown) be inserted through the holes 194 to attach the system 102 to the towing vehicle 184.

After the system 102 is attached to the towing vehicle, the method can further comprise pulling the system 102 through the ground with the towing vehicle such that the plowing apparatus 104 is located at a depth "D" 196 beneath the ground 182, and such that a length of film 134 is dispensed behind the plowing apparatus 104 and laid at the depth 196 as the towing vehicle moves forward pulling the system 102 behind it. The weight of the soil on the film 134 which has been pre-fed and dispensed can serve to anchor the end 186 of the film 134 so that the film 134 easily thereafter moves through the system 102.

In another embodiment herein the system 100 can comprise a system 200, where instead of having the longitudinal roll of film 128 above the plowing apparatus 104, the roll of film 128 can be in the plowing apparatus 104. The system 200 can employ any of the components of system 102 described herein, and references to the same components in system 102, e.g., longitudinal roll of film 128 will be similarly identified as longitudinal roll of film 228 in system 200, and the like for the remaining reference numerals used herein, and the descriptions of the components in system 102 will be deemed incorporated into the definition of the corresponding components in the system 200. Any of the components of system 102 not described in system 200 expressly are understood to still possibly be part of the system 200 and can be present in system 200 in the same location, orientation and of the same materials as described for system 102.

Figure 6:
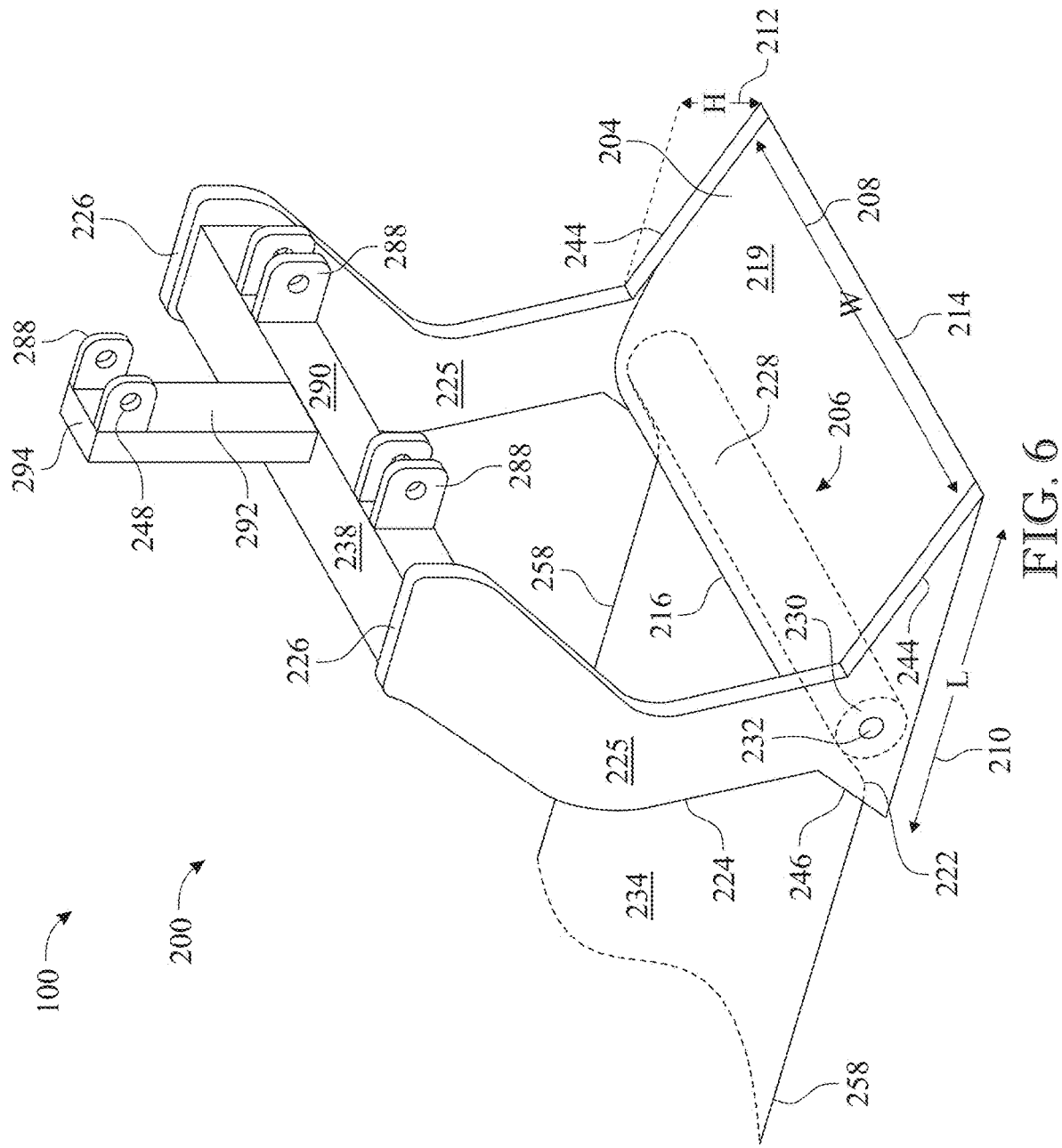
FIG. 6 presents a front perspective view of a plowing apparatus feeding embodiment of the underground water barrier installation system of the present invention.
Figure 7:
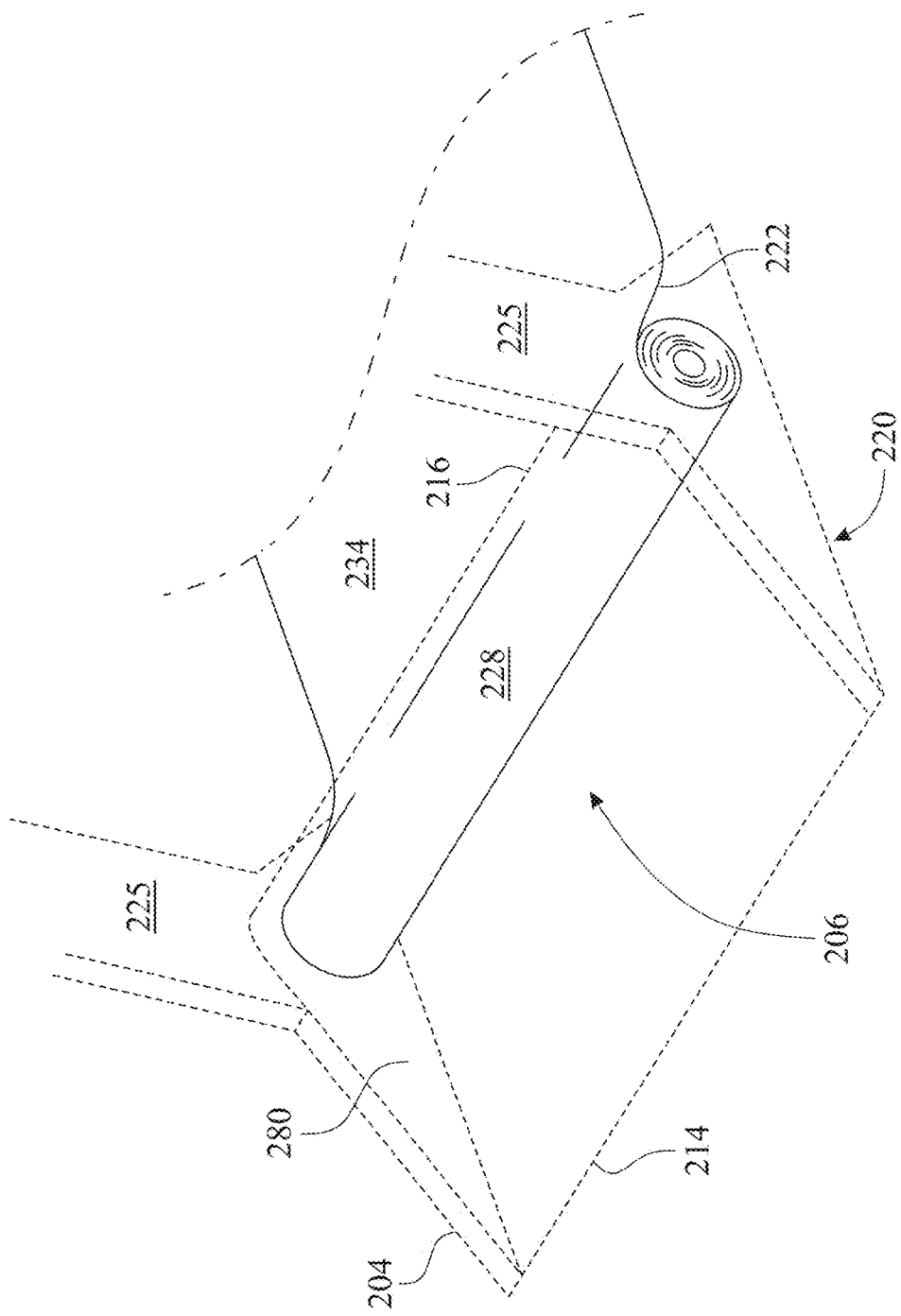
FIG. 7 presents a perspective view of the placement of a longitudinal roll of film in the underground water barrier installation system of FIG. 6; and, FIG. 8 presents an exploded view of the components used to support the longitudinal roll of film in the plowing apparatus feeding embodiment of the underground water barrier installation system of the present invention Like reference numerals refer to like parts throughout the several views of the drawings.
Figure 8:
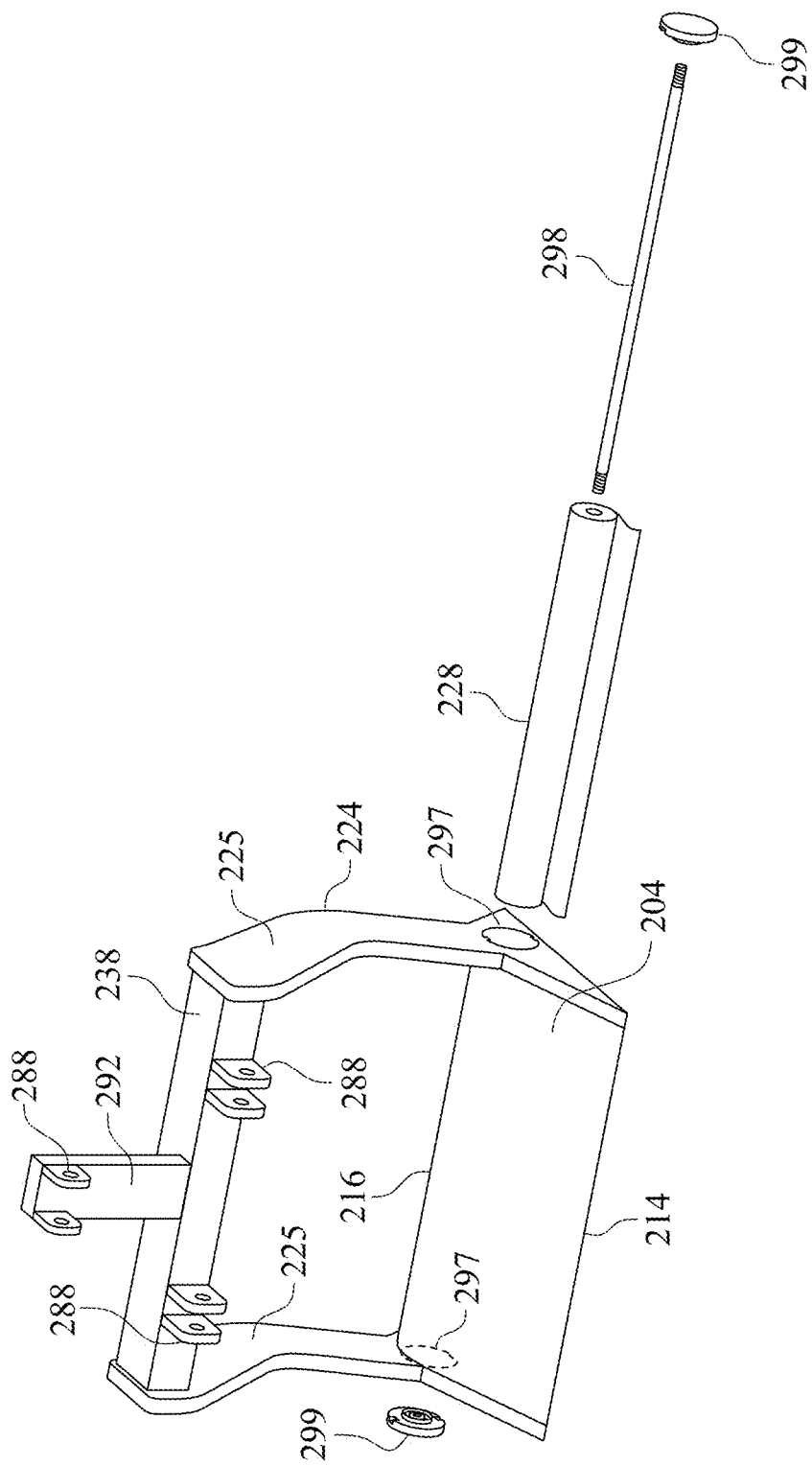

Referring to FIGS. 6-8, the system 200 can also have an internal chamber 206 which has a width 208, length 210 and height 212 and a flat bottom 220, and a slit 222 along a back side 216 of the plowing apparatus 204.

The system 200 can also have a frame 224 located above and connected to the plowing apparatus 204 and which frame 224 is oriented substantially perpendicular to the flat bottom 220 of the plowing apparatus 204, and which frame 224 has two flat side sections 225 which are parallel and encompass a width that is equivalent to the width 208 of the internal chamber 206 of the plowing apparatus 204.

The system 200 can also have a longitudinal roll of film 228 having two opposing longitudinal ends 230, wherein optionally, each end 230 can contain line (not shown) attached thereto along the longitudinal edge 258 of the film 234 wherein the longitudinal roll of film 228 is disposed in a releasable manner within the width of the internal chamber 206 of the plowing apparatus 204. The roll of film 228 can be smaller than the roll of film 128 used in system 102. The roll of film 228 can be of a length of from about ¼ of a mile to about ½ of a mile.

The system 200 can have a flat bottom 220 and a top side 219 that transitions from an inclined plane at the front side 214 to a curvilinear and then angled back side 216 and having two equivalently shaped sides extending from the front side 214 to the back side 216, said equivalently shaped sides make up a lower portion of the flat side sections 225 of the frame 224. The flat side sections 225 can comprise two equivalent (i.e., mirrored) vertically extending substantially flat side sections 225 which extend from the flat bottom 220 up to a top 226 of the flat side sections 225 and which are joined by a horizontal cross beam 238 therebetween.

Referring to FIG. 8, there longitudinal roll of film 228 can be disposed on a central supporting dowel 298 which can be capped on both sides of the dowel 298 by end caps 299. The end caps 299 can be fixed in corresponding openings 297 in the flat side sections 225 of the frame 224.

The system 200 can install an underground water barrier, i.e. film 234 by a method comprising providing the system 200; feeding the film 234 through the slit 222 in the back side 216 of the plowing apparatus 204; attaching the frame 224 of the system 200 to a towing vehicle (not shown); and, pulling the system 200 through the ground with the towing vehicle such that the plowing apparatus 204 is located at a depth beneath the ground, and such that a length of the film 234 is dispensed behind the plowing apparatus 204 and laid at the depth underneath the ground, such as is described above for the system 102.

In system 200, after feeding the film 234 through the slit 222 in the back 216 of the plowing apparatus 204, the film 234 can be affixed in place underground to provide an anchoring of the same and to facilitate the easy disposal of the remaining film 234 through the slit 222, as is described above with reference to FIG. 2.

The frame 224 of the system 200 can be attached to a towing vehicle (not shown) by two points of attachment 288 which are located on a front portion 290 of the crossbeam 238.

The frame 224 of the system 200 can be attached to the towing vehicle (not shown) by three points of attachment 288 two of which are located on a front portion 290 of the crossbeam 238 and a third attachment point 288 which is attached to a top portion 294 of a post 292 which is perpendicular to a top of the crossbeam 238.

As in the system 102, prior to the step of pulling of the underground water barrier installation system 200 through the ground with the towing vehicle, such is proceeded by the step of sinking the plowing apparatus into the ground to a desired depth as is described above with regard to FIG. 2

The underground water barrier installation system described herein can also be employed to in all forms and varieties water ways such as the non-limiting examples of canals, streams, brooks, ponds, rivers, lakes and the like.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An underground water barrier installation system comprising:

a plowing apparatus having an internal chamber which has a width, length, and a height, and a flat bottom and a slit along a back of the plowing apparatus;

a frame located above and connected to the plowing apparatus and which frame is oriented substantially perpendicular to the flat bottom of the plowing apparatus, and which frame has two flat side sections which are parallel and encompass a width that is substantially equivalent to the width of the internal chamber of the plowing apparatus; and, a longitudinal roll of film having two opposing longitudinal ends, and wherein the roll of film is disposed in a releasable manner within the width of the internal chamber of the plowing apparatus, and wherein the longitudinal roll of film is disposed on a central supporting dowel which is capped on both sides by end caps, and wherein the end caps are fixed in corresponding openings present in the vertically extending substantially flat side sections of the frame.

2. The underground water barrier installation system of claim 1, wherein the plowing apparatus has a flat bottom and a top that that transitions from an inclined plane front side to a curvilinear and then angled rear side and having two equivalently shaped sides extending from the front side to the back side.

3. The underground water barrier installation system of claim 1, wherein the flat side sections of the frame comprises two equivalent vertically extending substantially flat side sections which form the sides of the plowing apparatus, and which are joined at a top of the flat side sections by a horizontal cross beam therebetween.

4. A method of installing an underground water barrier comprising:

providing the underground water barrier system of claim 1;

feeding the film through the slit in the back of the plowing apparatus;

attaching the frame of the underground water barrier installation system to a towing vehicle; and, pulling the underground water barrier installation system through the ground with the towing vehicle such that the plowing apparatus is located at a depth beneath the ground, and such that a length of film is dispensed behind the plowing apparatus and laid at the depth underneath the ground.

5. The method of claim 4, wherein after the feeding of the film through the slit in the back of the plowing apparatus, the method further comprises affixing the film in place underground to provide an anchoring of the same and to facilitate the easy disposal of the remaining film through the slit.

6. The method of claim 4, wherein the frame of the underground water barrier installation system is attached to the towing vehicle by two points of attachment which are located on a front portion of the crossbeam.

7. The method of claim 4, wherein the frame of the underground water barrier installation system is attached to the towing vehicle by three points of attachment two of which are located on a front portion of the crossbeam and a third of which is attached to a front portion of a post which is perpendicular to a top of the crossbeam.

8. The method of claim 4, wherein prior to the step of pulling of the underground water barrier installation system through the ground with the towing vehicle, such is proceeded by a step of sinking the plowing apparatus into the ground to a desired depth.

\* \* \* \* \*